US005619088A

United States Patent [19]

Yumiyama et al.

[11] Patent Number: 5,619,088
[45] Date of Patent: Apr. 8, 1997

[54] REVOLVING ARMATURE FOR ROTARY ELECTRIC MACHINERY

[75] Inventors: Shigeru Yumiyama, Hitachinaka; Yoshimi Mori, Mito, both of Japan

[73] Assignee: Hitachi, Ltd., Japan

[21] Appl. No.: 593,439

[22] Filed: Jan. 29, 1996

[30] Foreign Application Priority Data

Jan. 30, 1995 [JP] Japan .................................. 7-012335

[51] Int. Cl.⁶ .......................... H02K 13/04; H02K 13/08
[52] U.S. Cl. .......................... 310/270; 29/331; 29/733; 29/735; 310/180; 310/201; 310/234
[58] Field of Search ............................ 310/270, 180, 310/201, 234; 29/331, 733, 735

[56] References Cited

U.S. PATENT DOCUMENTS

| | | | |
|---|---|---|---|
| 3,237,036 | 2/1966 | Konig | 310/270 |
| 4,705,977 | 11/1987 | Shibata et al. | 310/235 |
| 4,833,769 | 5/1989 | Tomite et al. | 29/597 |
| 5,097,167 | 3/1992 | Kanayama et al. | 310/201 |
| 5,422,526 | 6/1995 | Kawabata et al. | 310/201 |

Primary Examiner—Steven L. Stephan
Assistant Examiner—Tran N. Nguyen
Attorney, Agent, or Firm—Evenson, McKeown, Edwards & Lenahan, P.L.L.C.

[57] ABSTRACT

A plurality of insulator-coated coils wound in slots of a magnetic core in multiple layers have end portions including at least contact portions without insulator coatings and connected to risers of a commutator, and adjacent portions next to the contact portions but out of the risers. A stepped portion is formed in at least one of the adjacent portion of an upper coil and the adjacent portion of a lower coil of the insulator-coated coils wound in multiple layers at a location where the upper coil and the lower coil face each other in crossing relation. A sufficient gap distance between the upper and lower coils is ensured at the location where the coils cross each other, and the productivity of revolving armatures is improved.

9 Claims, 2 Drawing Sheets

REVOLVING ARMATURE FOR ROTARY ELECTRIC MACHINERY

BACKGROUND AND SUMMARY OF THE INVENTION

The present invention relates to a revolving armature for rotary electric machinery in which insulator-coated coils are wound in multiple layers, and more particularly to a revolving armature for rotary electric machinery which has a structure for maintaining an insulation distance between upper and lower coils near a riser of a commutator where insulator-coated coils are connected to the commutator.

A conventional revolving armature for rotary electric machinery is structured such that insulator-coated coils are wound in slots of a magnetic (iron) core in multiple layers and parts of the coils where insulator coatings are peeled off are electrically connected to a commutator conductor, i.e., its riser for coil connection. Such a known revolving armature for rotary electric machinery is described in, e.g., JP, A, 63-11045 and JP, A, 63-265550.

Heretofore, to electrically connect insulator-coated coils to the riser for coil connection, it has been required to peel off insulator coatings from distal ends of the insulator-coated coils beforehand. At this time, because of relatively large variations in the peeling work, adjacent portions of the insulator coatings which are located near the coil distal ends but out of the riser may be also peeled off excessively, in addition to contact portions thereof which are directly contacted with the riser. Accordingly, when the insulator-coated coils are wound in multiple layers, there is a possibility that an insulator peeled-off portion of an upper coil and an insulator peeled-off portion of a lower coil may cross each other and cause a short-circuit between the upper and lower coils.

For that reason, an interlayer insulating sheet is generally disposed between the upper and lower coils.

The above-stated prior art has had the problem that a work step of providing an interlayer insulating sheet between the upper and lower coils is necessary and the productivity of revolving armatures is poor.

An object of the present invention is to provide a revolving armature for rotary electric machinery which can be produced with high efficiency.

To achieve the above object, the present invention provides a revolving armature for rotary electric machinery comprising a magnetic core fixed to a shaft and having a plurality of slots formed in an outer periphery thereof, a plurality of insulator-coated coils wound in the slots of the magnetic core in multiple layers, and a commutator fixed to the shaft and provided with conductors including risers for connection to the insulator-coated coils, wherein end portions of the insulator-coated coils include at least contact portions deprived of insulator coatings and connected to the risers, and adjacent portions next to the contact portions but out of the risers, and a stepped portion is formed in at least one of the adjacent portion of an upper coil and the adjacent portion of a lower coil of the insulator-coated coils wound in multiple layers at a location where the upper coil and the lower coil face each other in crossing relation. With this arrangement, a sufficient insulation distance between the upper and lower coils is ensured at the location where the coils are crossing each other, an insulating member such as an interlayer insulating sheet is no longer needed, and the productivity of revolving armatures for rotary electric machinery is improved.

In the above revolving armature for rotary electric machinery, the stepped portion is preferably formed in both the adjacent portion of the upper coil and the adjacent portion of the lower coil at the location where the upper coil and the lower coil face each other. With this arrangement, a sufficient insulation distance between the upper and lower coils is ensured at the location where the coils are crossing each other, and an insulation failure is prevented.

In the above revolving armature for rotary electric machinery, the stepped portion formed in the adjacent portion and a peeled-off portion in the contact portion where the insulator coating is removed are preferably formed by pressing using a punching die.

In the above revolving armature for rotary electric machinery, when the stepped portion is preferably formed, the corresponding coil is cut in an amount not larger than that by which the coil is cut in the contact portion to deprive of the insulator coating for forming a peeled-off portion so that the coil has a cross-sectional area in the stepped portion not less than that in the contact portion. With this arrangement, in spite of forming the stepped portion in the coil, design of the rotary electric machinery is affected in no way by the formation of the stepped portion.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWING

Figure 1:
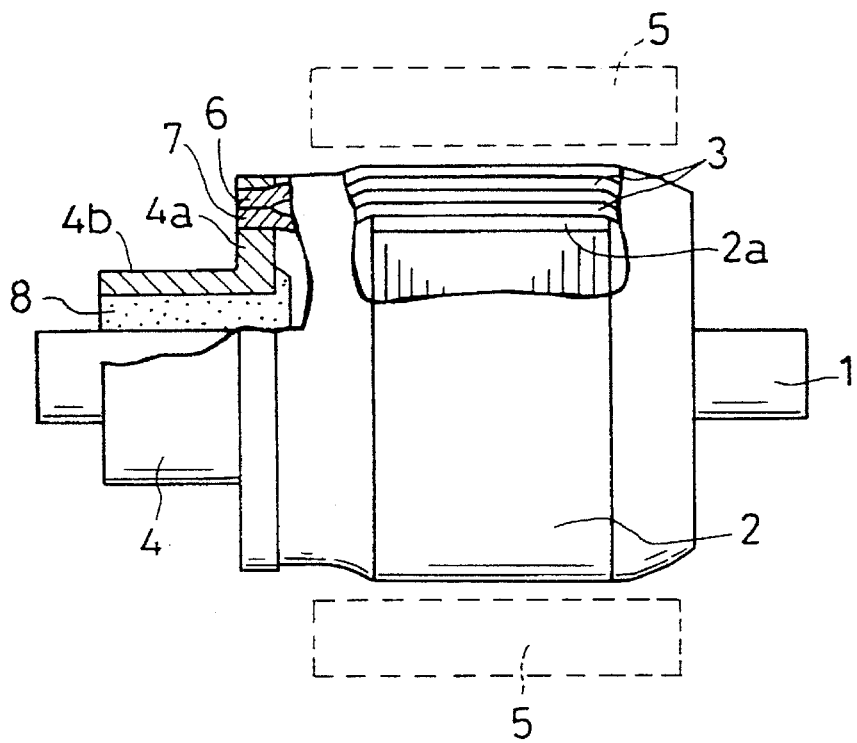
FIG. 1 is a partly sectioned view of a revolving armature for a rotary electric machine according to one embodiment of the present invention.

The revolving armature in FIG. 1 has a cylindrical magnetic core 2 fixed to a central shaft 1. In a plurality of slots 2a formed in an outer periphery of the cylindrical magnetic core 2, insulator-coated coils 3 are wound double. A commutator 4 is fixed to the shaft 1. The commutator 4 comprises an annular resin molding 8 fixed to the shaft 1 and a plurality of conductors 4b fixed to an outer periphery of the annular resin molding 8. Each of the conductors 4b is raised at one end radially to form a riser 4a. A lower coil 7 and an upper coil 6 of the insulator-coated coils 3 are electrically connected to the riser 4a with their insulator coatings peeled off.

Both ends of the shaft 1 are rotatably supported by brackets through bearings (not shown). Around the magnetic core of the revolving armature constructed as explained above, a stationary armature including field magnetic poles 5 each having a field magnetic core and a field magnetic coil are disposed by being fixed to the brackets, thereby constructing a rotary electric machine.

This type rotary electric machine is suitable for use as a torque machine such as a starter electric motor, but may be also applied to an electric generator having a similar structure.

Figure 2:
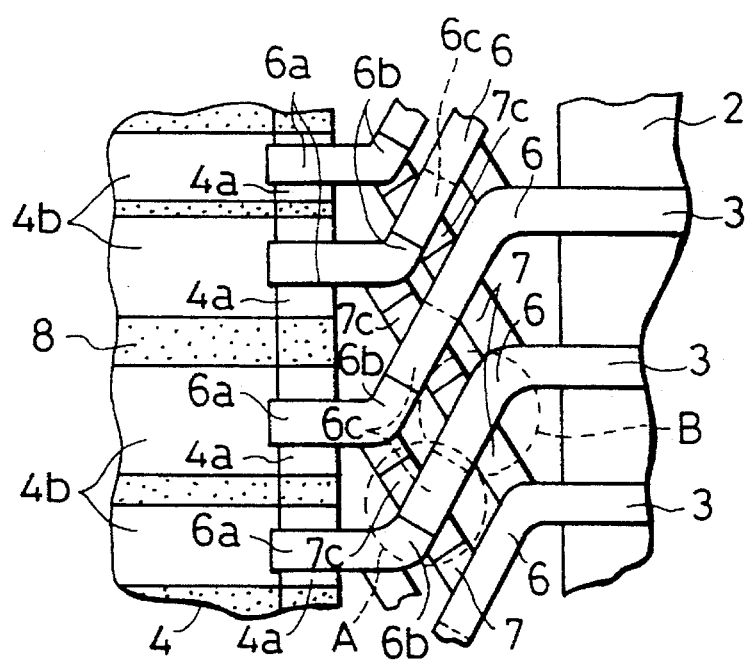
FIG. 2 is an enlarged view of part of FIG. 1.

FIG. 2 shows an enlarged view of part of FIG. 1 where the commutator 4 and extended ends of the insulator-coated coils 3 are connected to each other, and thereabout.

The insulator-coated coils 3 wound double in each of the slots of the magnetic core 2 are extended from a side end of the magnetic core 2 to the left and right, respectively, as the upper coil 6 and the lower coil 7. As shown, the upper coil 6 is first bent to the left and then bent back so as to extend parallel to the conductors 4b. The lower coil 7 is first bent to the right and then bent back so as to extend parallel to the conductors 4b.

The plurality of conductors 4b are arranged parallel to one another with part of the annular resin molding 8 located between adjacent twos. End portions of the conductors 4b on the same side as the magnetic core 2 are raised radially of the commutator 4 to form the risers 4a. The upper coil 6 and the lower coil 7 are bent like a crank, as shown, and their insulator coatings are peeled off beforehand from contact portions 6a, 7a at distal ends thereof. Then, the upper coil 6 and the lower coil 7 wound in respective slots spaced from each other with two slots between are laid one above the other and connected at the contact portions 6a, 7a to the riser 4a of the same conductor 4b. Accordingly, the upper coil 6 and the lower coil 7 cross each other in a space between the commutator 4 and the magnetic core 2. The upper coil 6 and the lower coil 7 are vertically spaced through a small gap distance on the side of the magnetic core 2, but the two coils 6, 7 are vertically contacted with each other on the side of the commutator 4. Therefore, it has been conventional to insert an insulating sheet in the space between the upper coil 6 and the lower coil 7. By contrast, in the present invention, the lower coil 7 has a stepped portion 7c formed in part of its adjacent portion 7b next to the contact portion 7a which part faces the upper coil 6, and the upper coil 6 has a stepped portion 6c formed in part of its adjacent portion 6b next to the contact portion 6a which part faces the lower coil 7.

The stepped portions 6c, 7c as structural features specific to this embodiment of the present invention will now be described with reference to FIG. 3.

Figure 3:
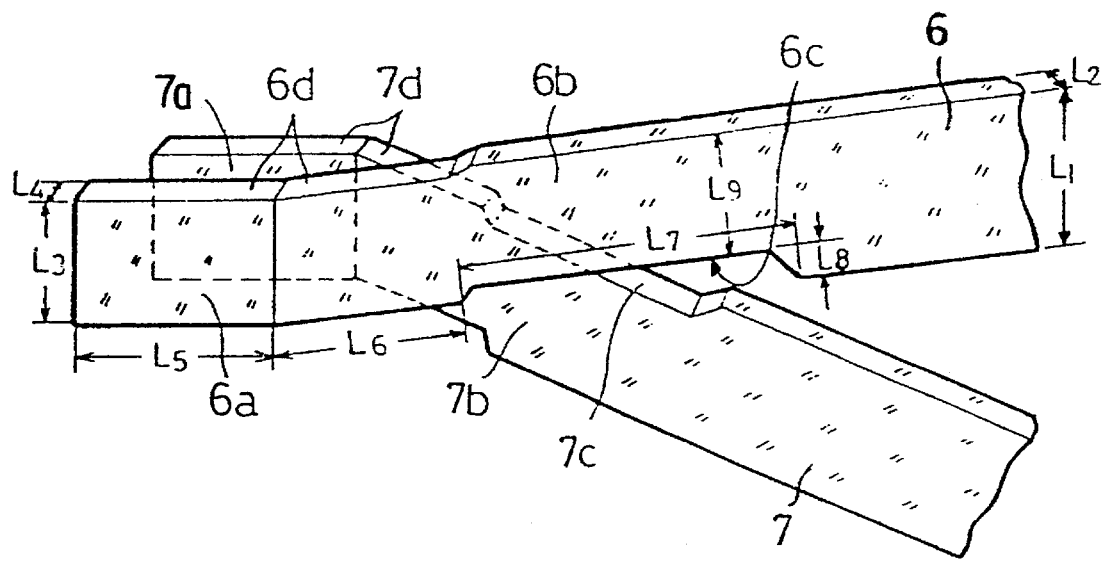
FIG. 3 is a perspective view of crossing portions of upper and lower coils of the revolving armature in FIG. 2.

FIG. 3 shows a perspective view showing the condition where the upper coil 6 and the lower coil 7 in FIG. 2 in the space between the commutator 4 and the magnetic core 2.

The extended end of the upper coil 6 comprises the contact portion 6a which is directly contacted with the riser 4a of the commutator 4, and the adjacent portion 6b which is located next to the contact portion 6a but out of the riser 4a. Likewise, the extended end of the lower coil 7 comprises the contact portion 7a which directly contacts the riser 4a of the commutator 4, and the adjacent portion 7b which is located next to the contact portion 7a but out of the riser 4a.

The stepped portions 6c, 7c are formed in parts of the adjacent portions 6b, 7b of the upper and lower coils 6, 7 which parts face each other.

The upper coil 6 and the lower coil 7 are entirely coated with insulator coatings such as enamel, but the insulator coatings are peeled off in peeled-off portions 6d, 7d at the coil distal ends which include coil surfaces brought into contact with the riser 4a and contact surfaces of the upper and lower coils. In the illustrated condition, while only the peeled-off portion 6d in an upper surface of the upper coil 6 and an upper surface of the lower coil 7 appear in the drawing, the peeled-off portions are also formed in lower surfaces opposite to those upper surfaces.

The upper coil 6 and the lower coil 7 are rectangular in cross-section as shown, and have a height $L_1$ of 3.2 mm and a width $L_2$ of 1.6 mm, for example, in the condition covered with the insulator coatings. The peeled-off portions 6d, 7d are formed by pressing using a punching die with a width of 3.1 mm. Therefore, the contact portions 6a, 7a where the peeled-off portions 6d, 7d are formed have a height $L_3$ of 3.1 mm and a width $L_4$ of 1.6 mm. Further, the contact portions 6a, 7a where the peeled-off portions 6d, 7d are formed have a length $L_5$ of 7 mm and parts of the adjacent portions 6b, 7b where the peeled-off portions 6d, 7d are formed have a length $L_6$ of 2 mm. These dimensions depend on the punching die used for the pressing, but the insulator coatings may be peeled off beyond desired areas in the peeling step. The present invention aims to solve the problem occurring in that case. From the viewpoint of connection to the riser 4a, the peeled-off portions 6d, 7d are only required in the contact portions 6a, 7a. In the present invention, however, the peeled-off portions 6d, 7d are provided in not only the contact portions 6a, 7a but also in parts of the adjacent portions 6b, 7b from the relation to the stepped portions 6c, 7c described later.

In areas of the adjacent portions 6b, 7b next to the peeled-off portions 6d, 7d, the stepped portions 6c, 7c are formed in the location where the upper coil 6 and the lower coil 7 face each other. The stepped portions 6c, 7c are also formed by pressing using a punching die. Accordingly, the peeled-off portions 6d, 7d and the stepped portions 6c, 7c are simultaneously formed by pressing.

The stepped portions 6c, 7c have a length $L_7$ of 6 mm and a depth $L_8$ of 0.1 mm in the illustrated embodiment. Therefore, the parts of the adjacent portions 6b, 7b where the stepped portions 6c, 7c are formed have a height $L_9$ of 3.1 mm which is the same as the height $L_3$ of the contact portions 6a, 7a where the peeled-off portions 6d, 7d are formed. Accordingly, the contact portions 6a, 7a where the peeled-off portions 6d, 7d are formed, the parts of the adjacent portions 6b, 7b where the peeled-off portions 6d, 7d are formed, and the parts of the adjacent portions 6b, 7b where the stepped portions 6c, 7c are formed all have the same height of 3.1 mm.

The above configuration is determined in consideration of electric resistance of the upper coil 6 and the lower coil 7. More specifically, the contact portions 6a, 7a are cut or reduced in the direction of height to form the peeled-off portions 6d, 7d, their electric resistance values being increased from the values before the formation of the peeled-off portions 6d, 7d. If the height of the stepped portions 6c, 7c is smaller than that of the peeled-off portions 6d, 7d, electric resistance of the stepped portions 6c, 7c would be increased and overall electric resistance of the coils would be dominated by the resistance values of the stepped portions 6c, 7c. This means that design of the entire rotary electric machine must be redone. In the present invention, the height of the stepped portions 6c, 7c is set to be not less than that of the peeled-off portions 6d, 7d, by cutting the coils 6, 7 to form the stepped portions 6c, 7c in an amount not larger than that by which the coils 6, 7 are cut in the contact portions to peel off the insulator coatings for forming the peeled-off portions 6d, 7d so that the coils have a cross-sectional area in the stepped portions 6c, 7c not less than that in the contact portions 6a, 7a. Consequently, parts of the upper and lower coils 6, 7 which have a minimum cross-sectional area are provided by the stepped portions 6c, 7c. Thus, even with the stepped portions 6c, 7c formed in the coils, there is no need of modifying the design of the rotary electric machine.

As a result of forming the stepped portions 6c, 7c in the location where the adjacent portions 6b, 7b of the upper and lower coils 6, 7 face each other as explained above, an insulation distance is ensured between the upper coil 6 and the lower coil 7. In the illustrated embodiment, because the insulation distance is 0.2 mm or more in comparison with the case of forming no stepped portions, both the coils are surely prevented from short-circuiting even without an insulating sheet between the coils.

The location where the stepped portions 6c, 7c are formed ranges from 9 mm to 15 mm away from the tip ends of the upper coil 6 and the lower coil 7, and corresponds to a region A and part of a region B encircled by broken lines in FIG. 2. More specifically, the region A represents a region where the upper coil 6 and the lower coil 7 in the alternate slots cross each other in vertically spaced relation near the riser 4a. The reason for forming the stepped portions 6c, 7c in the region A is that the gap distance between the upper coil 6 and the lower coil 7 is smaller than that in the region B where the upper coil 6 and the lower coil 7 in the adjacent slots cross each other. Further, in part of the region B which is near the region A, the stepped portions are also formed because the gap distance is narrowed there. Of course, when there is concern in the design stage that the upper and lower coils may contact each other in a position that is nearer to the magnetic core 2 than the region B, the stepped portions may be further extended. On the contrary, when the gap distance between the upper coil 6 and the lower coil 7 is sufficiently large, the stepped portions may be formed in only the region A. Such a design decision also depends on the number of the slots 2a. If the number of the slots is small, it is enough to form the stepped portions in the region A where the upper coil 6 and the lower coil 7 in the alternate slots cross each other in vertically spaced relation. As the number of the slots increases, it is required to not only form the stepped portions in the region A, but also extend them to the region B. In any case, the stepped portions are required to be formed in the region A where the upper coil 6 and the lower coil 7 in the alternate slots cross each other in vertically spaced relation.

As with the prior art, in the peeling step and the stepped portion forming step, there is a possibility that the insulator coatings may be peeled off excessively beyond desired areas. However, because this excessively peeled-off area is positioned in the region B or even nearer to the magnetic core 2, the gap distance between the upper coil 6 and the lower coil 7 in that peeled-off area is sufficiently large and hence the excessive peeling-off of the insulator coatings will cause no effect.

With the illustrated embodiment, because the stepped portions are formed in parts of the adjacent portions, which are next to the contact portions, of the upper and lower coils at the location where the two coils face each other, it is possible to ensure a sufficient gap distance between the upper coil 6 and the lower coil 7 and to prevent a failure due to short-circuiting.

Also, a short-circuit preventing part such as an interlayer insulating sheet which has been essential in the prior art is no longer needed, and the productivity of revolving armatures for rotary electric machinery is improved.

As a result, the production cost can be cut down to a lower level than in the prior art.

Further, because sufficient coil-to-coil distance is ensured, even the peeling work in which the insulator coatings tend to be peeled off excessively beyond desired design positions can be practically carried out. This means that highly accurate peeling work is not necessarily required.

Additionally, because the peeling step and the stepped portion forming step can be implemented by pressing in the same step, the stepped portions can be also formed in a time required for the conventional peeling step and hence employing the present invention will not increase the number of steps.

While the peeled-off portions and the stepped portions are simultaneously formed by pressing in the above description, both the portions may not be formed in the same step. Specifically, after forming the peeled-off portions by one pressing step, the stepped portions may be formed by another pressing step. As an alternative, the stepped portions may be formed by pressing after the peeling step has been performed by immersing the ends of the insulator-coated coils in a peeling solution, or by scraping off the insulator coatings at the coil ends.

Further, while the insulator-coated coils are described as having a rectangular cross-section, the cross-section is not limited to a rectangular shape and the present invention is also applicable to coils having a circular cross-section without changing the basic concept of the invention. In that case, however, when forming the stepped portions, it is required to provide a cut depth of the stepped portions in consideration of a cross-sectional area of the peeled-off portions, because the cross-sectional area of parts of round coils remaining after the formation of the stepped portions varies non-linearly depending on the cut depth.

Figure 4:
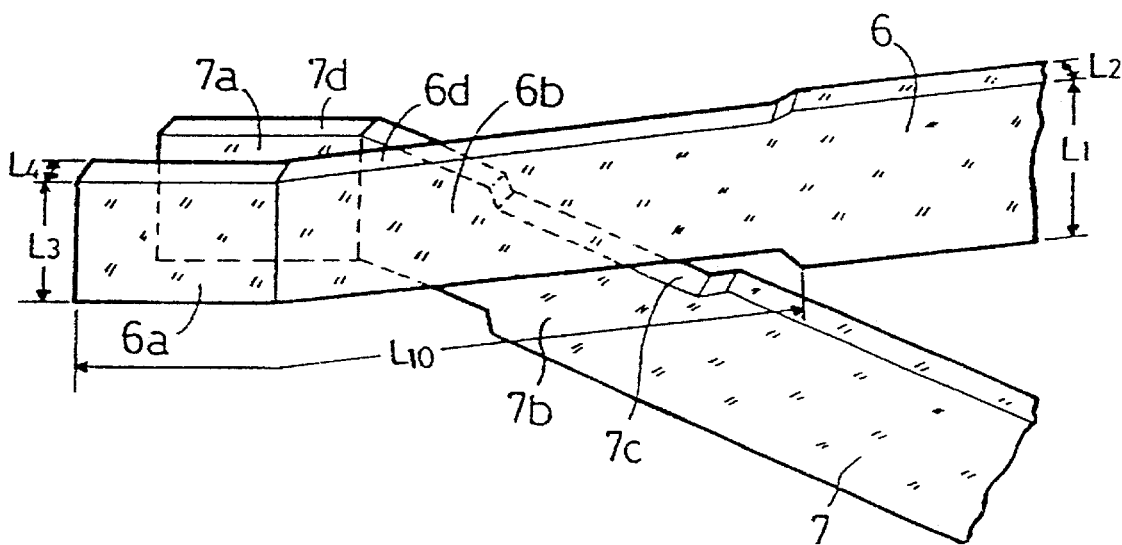
FIG. 4 is a perspective view of crossing portions of upper and lower coils of the revolving armature according to another embodiment of the present invention.

FIG. 4 illustrates another embodiment of the present invention and is a perspective view showing the condition where an upper coil 6 and a lower coil 7 are crossing in the space between the commutator 4 and the magnetic core 2.

In this embodiment, the upper coil 6 and the lower coil 7 a different configuration from each other. Specifically, the lower coil 7 has the same configuration as in the embodiment shown in FIG. 3, and has an extended end comprising a contact portion 7a which is directly contacted with the riser 4a of the commutator 4, and an adjacent portion 7b which is located next to the contact portion 7a but out of the riser 4a.

A stepped portion 7c is formed in part of the adjacent portion 7b of the lower coil 7 which part faces the upper coil 6. An insulator coating of the lower coil 7 is peeled off by pressing in a peeled-off portion 7d at a distal end of the coil. The stepped portion 7c is located in part of the adjacent portion 7b next to the peeled-off portion 7d where the upper coil 6 and the lower coil 7 face each other. The stepped portion 7c is also formed by pressing using a punching die. Accordingly, the peeled-off portion 7d and the stepped portion 7c are simultaneously formed by pressing. Dimensions of the peeled-off portion 7d and the stepped portion 7c are the same as those in the embodiment of FIG. 3.

On the other hand, the upper coil 6 forms only a peeled-off portion 6d having a length $L_{10}$ of 15 mm. The other dimensions $L_1$, $L_2$, $L_3$ and $L_4$ are the same as those in the embodiment of FIG. 3. Accordingly, the upper coil 6 has uniform dimensions defining the outer configuration and the same cross-sectional area over a region from the contact portion 6a to the adjacent portion 6b.

As a result of forming the stepped portion 7c in the location where the adjacent portions 6b, 7b of the upper and lower coils 6, 7 face each other as explained above, an insulation distance is ensured between the upper coil 6 and the lower coil 7. In this embodiment, because the insulation distance is 0.15 mm or more in comparison with the case of forming no stepped portions, both the coils are positively prevented from short-circuiting even without an insulating sheet between the coils.

The location where the stepped portion 7c is formed ranges from 9 mm to 15 mm away from the tip end of the lower coil 7, and corresponds to a region A encircled by a broken line in FIG. 2. More specifically, the region A represents a region where the upper coil 6 and the lower coil 7 in the alternate slots cross each other in vertically spaced relation near the riser 4a. The reason for forming the stepped portion 7c in the region A is that the gap distance between the upper and lower coils is smaller than that in a region B encircled by a broken line where the upper coil 6 and the lower coil 7 in the adjacent slots cross each other. Of course, when there is concern in the design stage that the upper and lower coils may contact each other in the region B as well, the stepped portion may be extended to the region B.

This embodiment is suitable for application to, e.g., insulator-coated coils having a circular cross-section. Specifically, the upper and lower coils are bent or twisted in opposite directions after being inserted to the slots of the magnetic core and, depending on the coil shape, the stepped portions of the upper and lower coils are hard to position in opposed relation when twisted. This embodiment is suitable for use in such a case.

With this embodiment, because the stepped portion is formed in part of the adjacent portion, which is next to the contact portion, of the lower coil at the location where the upper and lower coils face each other, it is possible to ensure a sufficient gap distance between the upper and lower coils and to prevent a failure due to short-circuiting.

Also, a short-circuit preventing part such as an interlayer insulating sheet which has been essential in the prior art is no longer needed, and the productivity of revolving armatures for rotary electric machinery is improved.

As a result, the production cost can be cut down to a lower level than in the prior art.

Further, because a sufficient coil-to-coil distance is ensured, even the peeling work in which the insulator coatings tend to be peeled off excessively beyond desired design positions can be practically carried out. This means that the highly accurate peeling work is not necessarily required.

While the peeled-off portion and the stepped portion are simultaneously formed by pressing in the above description, both the portions may not be formed in the same step. Specifically, after forming the peeled-off portion by one pressing step, the stepped portion may be formed by another pressing step. As an alternative, the stepped portion may be formed by pressing after the peeling step has been performed by immersing the end of the insulator-coated coil in a peeling solution.

According to the present invention, revolving armatures for rotary electric machinery can be produced with improved efficiency.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A revolving armature for rotary electric machinery comprising a magnetic core fixed to a shaft and having a plurality of slots formed in an outer periphery thereof, a plurality of insulator-coated coils wound in said slots of said magnetic core in multiple layers, and a commutator fixed to said shaft and provided with conductors including risers for connection to said insulator-coated coils, wherein said insulator-coated coils have end portions which include at least contact portions without insulator coatings and connected to said risers, and portions adjacent said contact portions, and stepped portions are formed in at least one of the adjacent portion of upper ones of said coils and the adjacent portion of lower ones of said coils wound in multiple layers at a location where said upper coils and said lower coils each crossingly face each other.

2. A revolving armature for rotary electric machinery according to claim 1, wherein said stepped portion is formed in both the adjacent portion of said upper coil and the adjacent portion of said lower coil at the location where said upper coil and said lower coil face each other.

3. A revolving armature for rotary electric machinery according to claim 1, wherein said stepped portion formed in said adjacent portion and a peeled-off portion in said contact portion without said insulator coating are formed by pressing using a punching die.

4. A revolving armature for rotary electric machinery according to claim 1, wherein when said portions are formed, the corresponding coil is cut in an amount related to that amount by which said coil is cut in said contact portion to strip the insulator coating for forming a peeled-off portion so that said coil has a cross-sectional area in said stepped portion in a predetermined relationship to that in the contact portion.

5. In a rotary electric machine, a revolving armature comprises a magnetic core fixed to a shaft and having a plurality of slots formed in an outer periphery thereof, a plurality of insulator-coated coils wound in said slots of said magnetic core in multiple layers, and a commutator fixed to said shaft and provided with conductors including risers for connection to said insulator-coated coils, wherein said insulator-coated coils have end portions which include at least contact portions without insulator coatings and connected to said risers, and portions adjacent said contact portions, and stepped portions are formed in at least one of the adjacent portion of upper ones of said coils and the adjacent portion of lower ones of said coils wound in multiple layers at a location where said upper coils and said lower coils each crossingly face each other.

6. The rotary electric machine according to claim 5, wherein said stepped portion is formed in both the adjacent portion of said upper coil and the adjacent portion of said lower coil at the location where said upper coil and said lower coil face each other.

7. The rotary electric machine according to claim 5, wherein said stepped portion formed in said adjacent portion and a peeled-off portion in said contact portion without said insulator coating are formed by pressing using a punching die.

8. The rotary electric machine according to claim 5, wherein when said stepped portions are formed, the corresponding coil is cut in an amount related to that by which said coil is cut in said contact portion to strip the insulator coating for forming a peeled-off portion so that said coil has a cross-sectional area in said stepped portion in a predetermined relationship to that in the contact portion.

9. A method for forming a revolving armature for rotary electric machinery, comprising the steps of winding a plurality of upper and lower insulator-coated coils in multiple layers in a plurality of slots in an outer periphery of a magnetic core such that two coils have end portions which include at least contact portions without insulator coatings for connection to commutator risers and portions adjacent said contact portions, and forming a stepped portion in at least one of the adjacent portion of said upper coils and the adjacent portion of said lower coils where said upper and lower coils face each other.

* * * * *